US012587072B2

(12) United States Patent

Mayer et al.

(10) Patent No.: US 12,587,072 B2

(45) Date of Patent: Mar. 24, 2026

(54) CONVERTER MOTOR HAVING A BRAKING RESISTOR

(71) Applicant: SEW-EURODRIVE GMBH & CO. KG, Bruchsal (DE)

(72) Inventors: Ralph Mayer, Ubstadt-Weiher (DE); Franz Daminger, Ludwigshafen am Rhein (DE); Steffen Klauck, Kronau (DE); Marc Stammberger, Knittlingen (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 218 days.

(21) Appl. No.: 18/579,576

(22) PCT Filed: Jun. 27, 2022

(86) PCT No.: PCT/EP2022/067596

§ 371 (c)(1),
(2) Date: Jan. 16, 2024

(87) PCT Pub. No.: WO2023/285127

PCT Pub. Date: Jan. 19, 2023

(65) Prior Publication Data

US 2024/0305171 A1    Sep. 12, 2024

(30) Foreign Application Priority Data

Jul. 16, 2021    (DE) .................... 10 2021 003 694.8

(51) Int. Cl.
*H02K 5/22* (2006.01)
*H02K 11/00* (2016.01)
(Continued)

(52) U.S. Cl.
CPC ............. *H02K 11/33* (2016.01); *H02K 5/225* (2013.01); *H02K 11/0094* (2013.01); *H02K 11/0141* (2020.08); *H02K 2211/03* (2013.01)

(58) Field of Classification Search
CPC .......... H02K 5/22; H02K 5/225; H02K 11/01; H02K 11/0094; H02K 11/0141;
(Continued)

(56) References Cited

U.S. PATENT DOCUMENTS 7,781,926 B2    8/2010  Schmidt
2007/0210661 A1 *  9/2007  Schmidt ................. H02K 5/225
310/90

(Continued)

FOREIGN PATENT DOCUMENTS

CN    204259352 U  *  4/2015
CN    207069950 U  *  3/2018
(Continued)

OTHER PUBLICATIONS

Wang, Machine Translation of CN207069950, Mar. 2018 (Year: 2018).*

(Continued)

*Primary Examiner* — Eric Johnson
(74) *Attorney, Agent, or Firm* — Carter, DeLuca & Farrell LLP

(57) ABSTRACT

A converter motor includes a braking resistor, and an electric motor with a junction box. The junction box is formed from a bottom part and a cover placed on the bottom part, and a printed circuit board of the converter is fastened to the cover. A braking resistor is thermally conductively connected to the bottom part and/or fastened on the bottom part, and a metal sheet is connected to the bottom part. The braking resistor is arranged on that side of the metal sheet which is averted from the printed circuit board.

22 Claims, 4 Drawing Sheets

(51) Int. Cl.
H02K 11/01 (2016.01)
H02K 11/33 (2016.01)

(58) Field of Classification Search
CPC .............................. H02K 11/30; H02K 11/33;
H02K 11/221103; H02K 2211/03
See application file for complete search history.

(56) References Cited

U.S. PATENT DOCUMENTS

| | | | | |
|---|---|---|---|---|
| 2010/0237722 | A1* | 9/2010 | Schmidt | H02K 5/225 |
| | | | | 310/71 |
| 2019/0319529 | A1* | 10/2019 | Yamano | H02M 1/10 |
| 2022/0263380 | A1 | 8/2022 | Brödner | |

FOREIGN PATENT DOCUMENTS

| | | | |
|---|---|---|---|
| CN | 211127444 U | 7/2020 | |
| DE | 102010021513 A1 | 12/2011 | |
| DE | 102010047762 A1 * | 4/2012 | H02K 11/0094 |
| DE | 102020003754 A1 | 1/2021 | |
| DE | 102020005858 A1 | 4/2021 | |
| EP | 2660968 A1 | 11/2013 | |
| GB | 2336254 A * | 10/1999 | H02M 7/003 |
| WO | 2005/107042 A1 | 11/2005 | |

OTHER PUBLICATIONS

Schmidt, Machine Translation of DE102010021513, Dec. 2011 (Year: 2011).*
Schmidt, Machine Translation Do DE102010047762,Apr. 2012 (Year: 2012).*
International Report on Patentability issued in corresponding International Application No. PCT/EP2022/067596, dated Jan. 16, 2024, pp. 1-9, English Translation.
International Search Report issued in corresponding International Application No. PCT/EP2022/067596 dated Oct. 17, 2022, pp. 1-2, English Translation.

* cited by examiner

CONVERTER MOTOR HAVING A BRAKING RESISTOR

FIELD OF THE INVENTION

The present invention relates to a converter motor having a braking resistor.

BACKGROUND INFORMATION

In certain conventional systems, a converter motor has a converter integrated in a junction box of the electric motor of the converter motor, which converter supplies the stator windings of the electric motor with electrical power so that the speed of the electric motor can be controlled or regulated.

SUMMARY

Example embodiments of the present invention provide a converter motor with a low error rate.

According to example embodiments of the invention, an inverter motor with braking resistor includes an electric motor with a junction box. The junction box is formed from a bottom part and a cover placed on the bottom part, and a printed circuit board of the converter, e.g., a printed circuit board of the converter fitted with signal electronics and power electronics, is fastened to the cover, e.g., on the inner side of the cover. A braking resistor is thermally conductively connected to the bottom part, e.g., for dissipating the heat of the braking resistor to the bottom part, and/or is fastened to the bottom part. A sheet, e.g., a metal sheet, is connected to the bottom part, and the braking resistor is arranged on that side of the metal sheet which is averted from the printed circuit board.

Thus, the feedback effects of the braking resistor on the electronics of the converter motor are minimized. For example, a metal sheet shields the braking resistor, especially its high-frequency electromagnetic interference radiation, which is generated by the pulse-width modulated operation of the controllable switch connected in series with the braking resistor. This reduces the interference radiation acting on the signal electronics and thus also provides for low-feedback operation, e.g., low-error operation.

According to example embodiments, the converter has a rectifier whose DC-side connection is connected to the DC-side connection of an inverter of the converter, e.g., a series circuit formed from a braking resistor and a pulse-width modulated controlled switch is fed by the voltage applied to the DC-side connection of the rectifier and/or the inverter. Thus, if a threshold value is exceeded, a further increase in the intermediate circuit voltage can be avoided by adjusting the pulse-width modulated control of the controllable switch accordingly. As the intermediate circuit voltage increases, the pulse width modulation ratio can also be changed accordingly.

According to example embodiments, the braking resistor has a semiconductor material or is arranged as a semiconductor, e.g., without wire winding, and/or the braking resistor is arranged as a PTC braking resistor. Thus, there is no wire winding and therefore only a low inductance, so that no low-frequency alternating magnetic field is generated by the braking resistor, thus preventing interference with the signal electronics. In addition, by selecting a PTC material, i.e., a material with a positive temperature coefficient, the braking resistor can be self-protecting if the heat flow cannot be dissipated to the environment quickly enough. In contrast, a configuration made of wire, i.e., not of semiconductor material but with a wire winding, could not only be provided with a higher inductance, but could also be overloaded for short periods, in which the metal sheet also contributes to the dissipation of heat.

According to example embodiments, the converter feeds the electric motor. Thus, the speed can be controlled or regulated.

According to example embodiments, the converter is arranged in the junction box of the electric motor, e.g., arranged in an integrated manner. Thus, only a small installation space is required and the drive can be arranged decentrally in the field, i.e., without a switch cabinet.

According to example embodiments, a further printed circuit board is arranged between a base part and a rear wall connected to the base part, and the base part is received in the bottom part and is connected to the bottom part. Thus, contact protection can be provided for the electrical cables of the further printed circuit board.

According to example embodiments, the further printed circuit board is fitted with a connection, e.g., with a connection device, for supply lines of the braking resistor, and the further printed circuit board is fitted with a plug connector part and the printed circuit board is fitted with a mating plug connector part, e.g., with a mating plug connector part corresponding to the plug connector part. Thus, the braking resistor can be electrically connected to the plug connector part so that the braking resistor can be supplied via the plug connector. This means that the rectifier and the inverter can be arranged in the cover and the intermediate circuit voltage can be routed to the braking resistor.

According to example embodiments, the supply lines are routed from the braking resistor to the connection. Thus, the braking resistor can be wired in the bottom part and can be operated only once the cover is fitted.

According to example embodiments, the metal sheet has two legs which are connected via a yoke region of the metal sheet, and the supply lines of the braking resistor are arranged routed on the side of one of the legs averted from the printed circuit board. For example, the braking resistor is arranged on that side of the yoke region which is averted from the printed circuit board. Thus, the supply lines are arranged in an elongated manner and the metal sheet shields the electronics of the converter from interference radiation. This provides for low-error operation of the converter. For example, at least more than half the length, e.g., more than 80%, of the supply lines from the braking resistor to the connection are shielded by the metal sheet. Additionally, for example, the data lines and/or extra-low voltage lines routed from the outside through cable glands of the bottom part into the junction box are arranged on the side of the sheet metal averted from the braking resistor.

According to example embodiments, the metal sheet is a punched and bent part which is, for example, flat. Thus, ready production is possible.

According to example embodiments, the electric motor has a stator housing which receives a stator of the electric motor, and the vertical projection of the two legs and the yoke region in the normal direction, e.g., of the printed circuit board, borders the vertical projection of an opening in the stator housing in the normal direction, e.g., of the printed circuit board. Thus, the stator winding wires can be routed from the region of the stator winding through the opening to the further printed circuit board. This means that the stator winding wires can be fed from the converter via the plug connector.

According to example embodiments, the metal sheet has such a hole pattern, e.g., continuous holes arranged such that shield clamps can be fastened at different positions on the metal sheet. For example, the shield clamps are adapted to be rotated by 90° or 180° relative to each other. Thus, depending on the respective configuration, the respective hole can be used for the respective shield clamp. This means that the cable routing can be flexibly adapted.

According to example embodiments, cable glands are arranged on three different sides of the bottom part, and the feeding of cables through cable glands can be carried out in different directions, e.g., from directions rotated 90° or 180° relative to each other. Thus, the cable routing can be flexibly adapted and the shield clamps can nonetheless be arranged as close as possible to the cable glands.

According to example embodiments, retaining sections are formed on the base part, which are pressed onto the bottom part via screws. Thus, a stable fastening of the base part in the bottom part can be achieved.

According to example embodiments, a grounding plate is received in one of the retaining sections. Thus, a ground connection of the bottom part can be achieved by two screws which protrude through the grounding plate and one of the retaining sections and are screwed into threaded holes in the bottom part.

According to example embodiments, the further printed circuit board is fitted with a connection for low voltages and a connection for extra-low voltages as well as a connection for data transmission, and a low-voltage cable, an extra-low voltage cable, and/or a data transmission cable is routed through at least one cable gland of the bottom part and is fixed to the metal sheet via at least one shield clamp. For example, an exposed shield of the or one of the cables is electrically connected to the metal sheet via the shield clamp, and, for example, the metal sheet is electrically connected to the bottom part and/or the grounding plate. Thus, all connections can be connected to the printed circuit board, e.g., to the electronics of the converter, via the plug connector. Thus, a universal bidirectional interface for power, signals, and data is created via the plug connector.

Further features and aspects of example embodiments of the present invention are explained in more detail below with reference to the appended schematic Figures.

DETAILED DESCRIPTION

Figure 1:
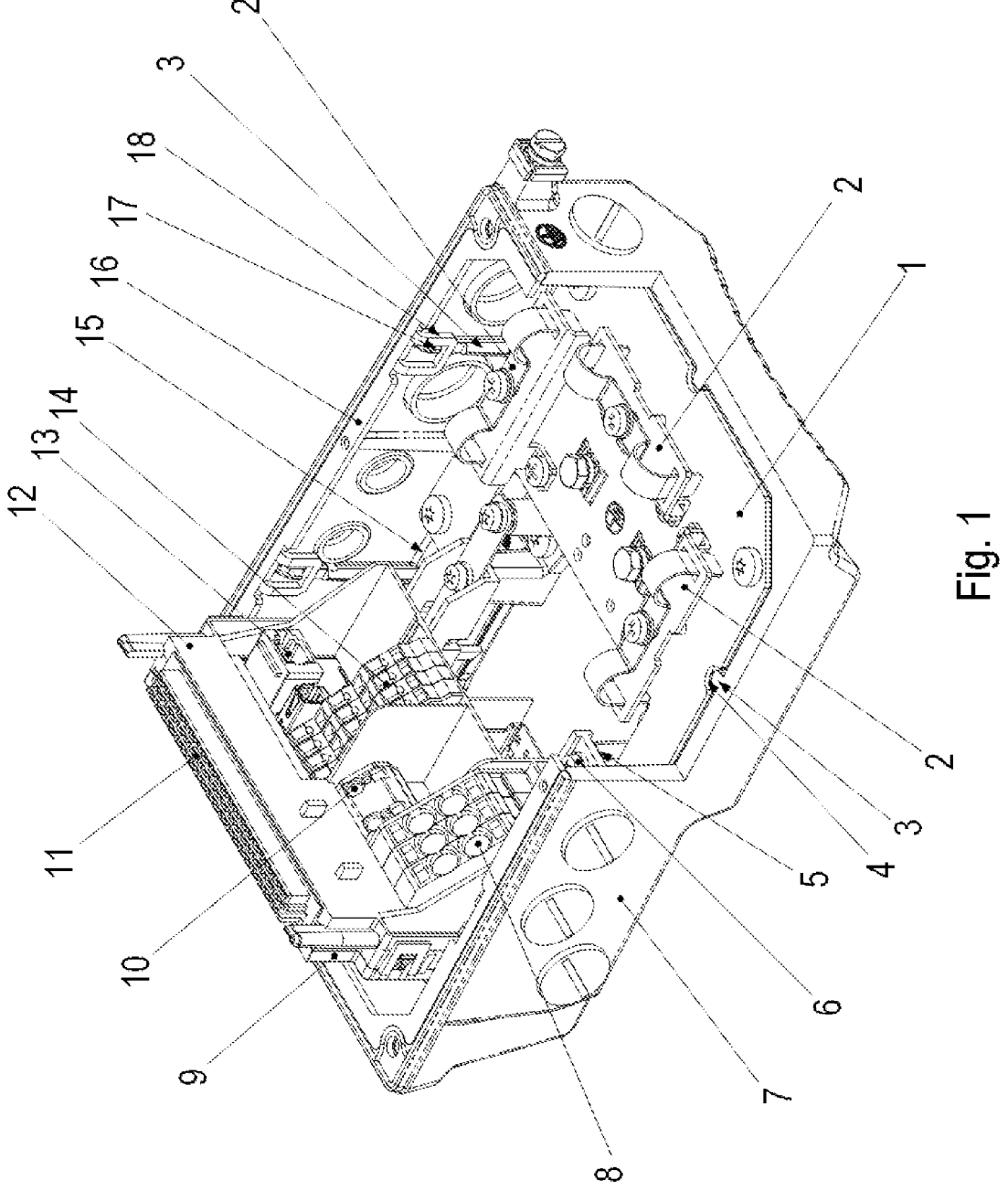
FIG. 1 is a perspective view of a section of a bottom part 7 of a junction box of a converter motor, the bottom part 7 including a metal sheet 1.
Figure 2:
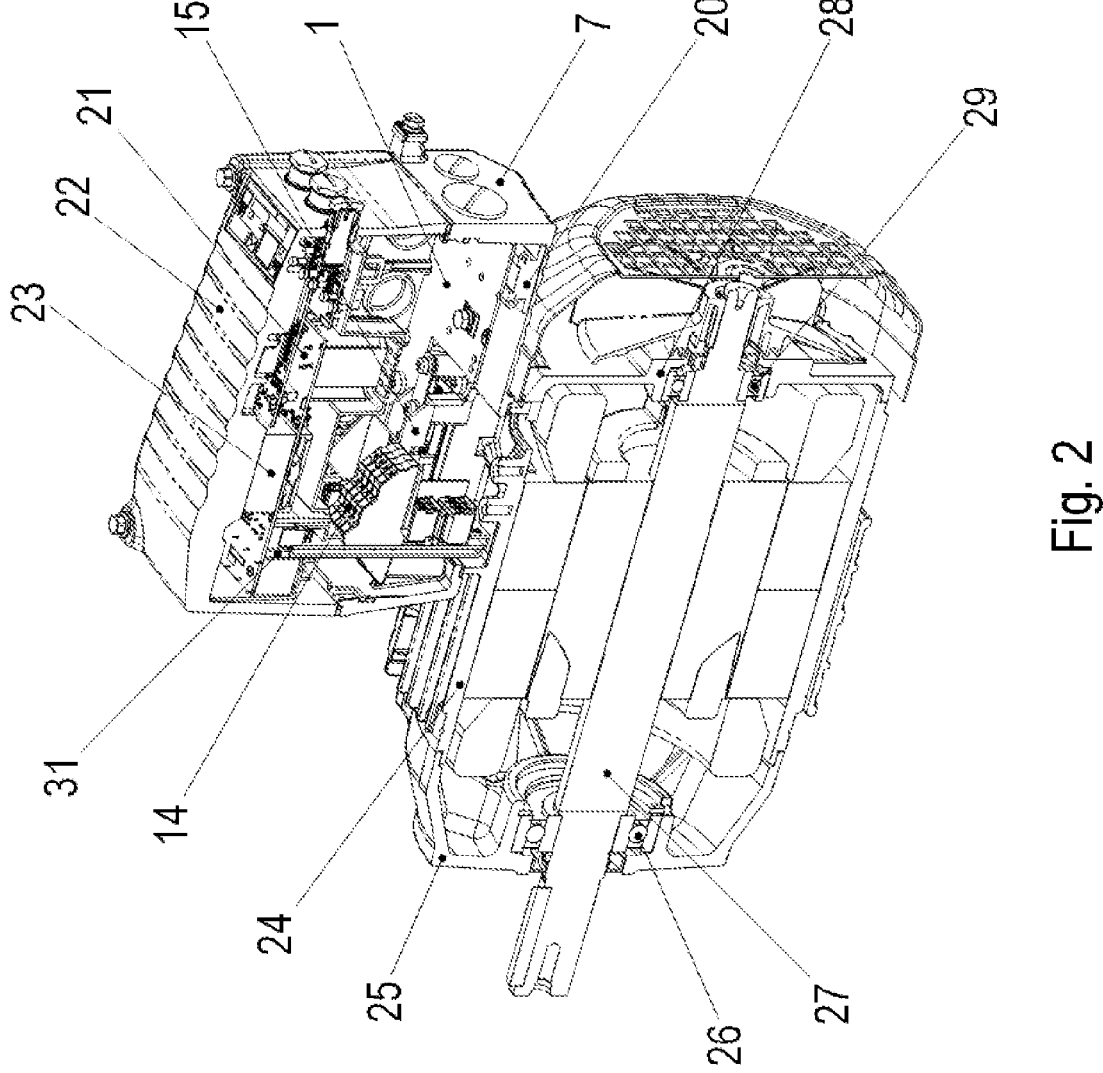
FIG. 2 is a perspective view of a section of the converter motor.
Figure 3:
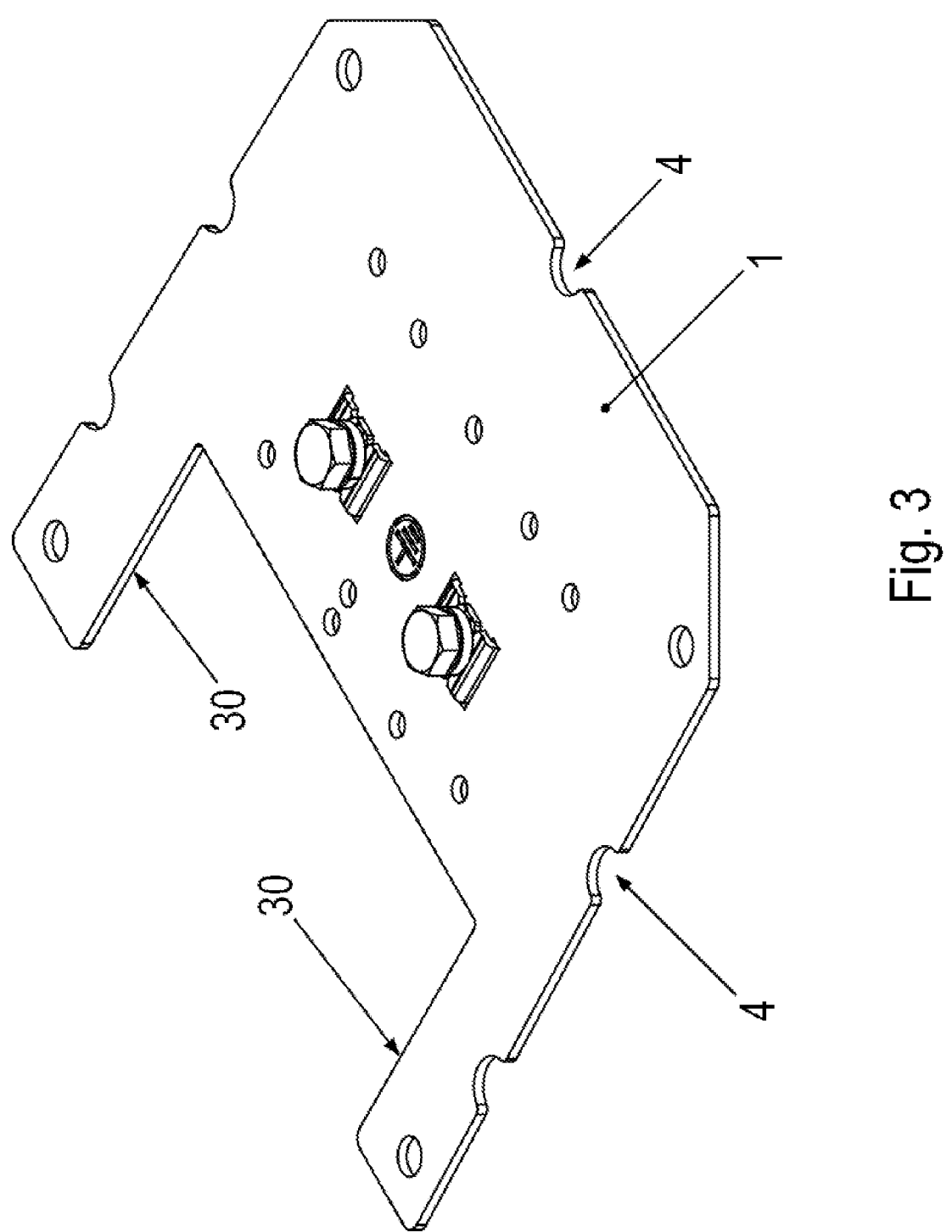
FIG. 3 is a perspective view of the metal sheet 1.
Figure 4:
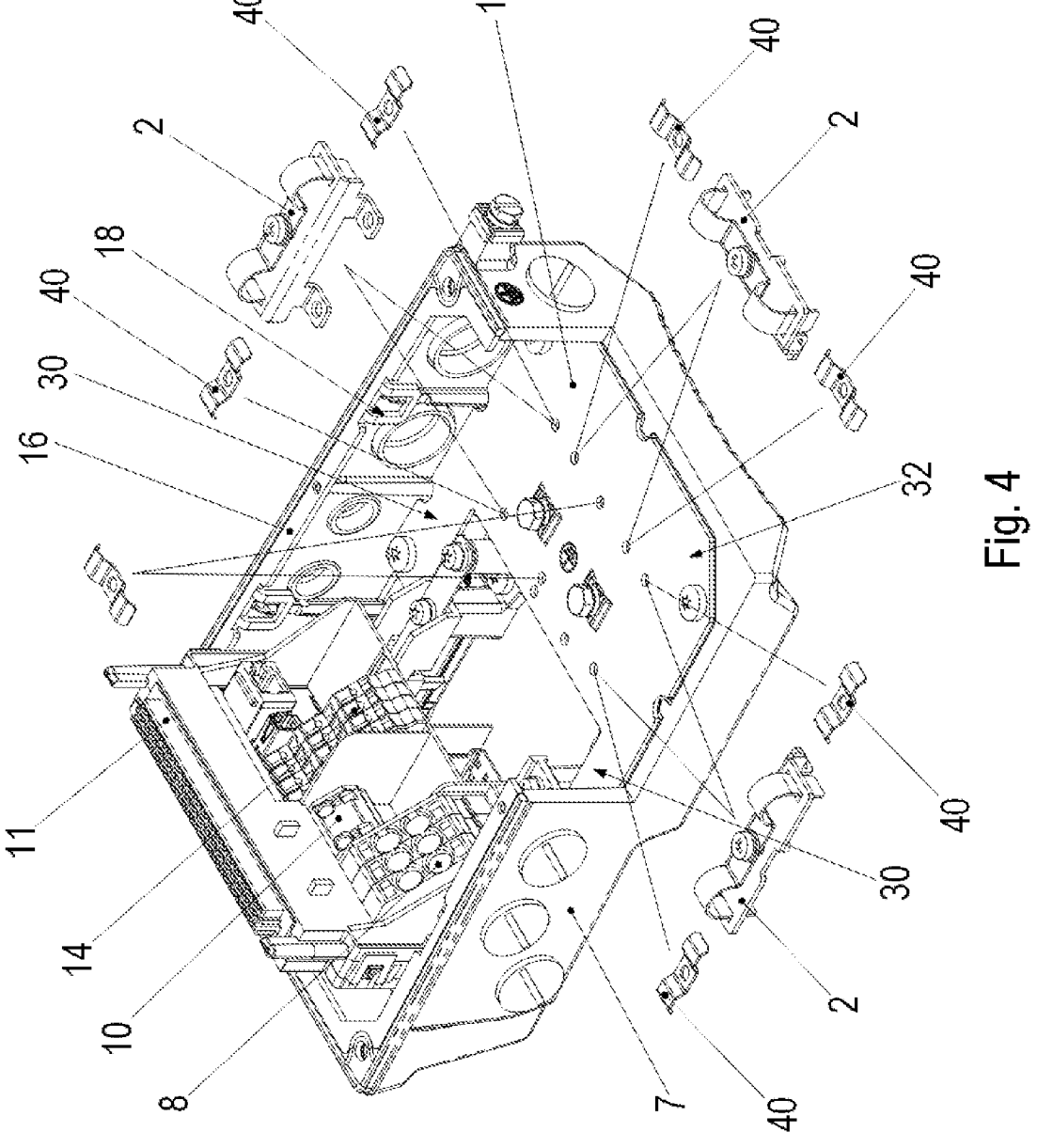
FIG. 4 is a perspective view of the bottom part with shield clamps 2, 40.

As illustrated in the Figures, the converter motor has an electric motor with a junction box, and an inverter is arranged in the junction box in an integrated manner.

The electric motor has a stator housing 24 receiving the stator windings, which is connected to a first bearing flange 25 and is connected to a second bearing flange 28, and the first bearing flange 25 is spaced apart from the second bearing flange 28.

A bearing 26, 29 is received in each of the bearing flanges 25, 28 for mounting a rotor shaft 27 of the electric motor.

The stator winding wires are routed out of the region of the stator through an opening in the stator housing 24 into the interior formed by the junction box and are electrically connected to a printed circuit board 21 via a plug connector including a plug connector part 11.

The printed circuit board 21 is fastened to the cover 22 via screws and is fitted with components, so that a converter including signal electronics and power electronics is arranged on the inner side of the cover 22. The power semiconductors 23 are thermally connected to the cover 22 itself. In this manner, the heat dissipation of the power semiconductors 23 of the power electronics can be spread directly via the cover 22 and dissipated to the environment.

The voltage provided by the converter for the stator windings of the electric motor is passed through the plug connector to the bottom part 7, where the stator winding wires are contacted.

The mains supply to the converter is routed via a supply cable, e.g., a three-phase cable, through a cable gland arranged on the bottom part 7 into the interior of the junction box. The supply cable can be fixed to the cable via a shield clamp 2. The lines, e.g., phase lines and neutral conductors, of the supply cable are routed from the shield clamp 2 to a connection 8 for low voltage and electrically connected.

This connection 8 is fitted on a further printed circuit board, which is also fitted with a plug connector part 11, which is brought into electrical plug contact with a mating plug connector part fitted on the printed circuit board 21, e.g., when the cover 22 is placed on the bottom part 7.

Since the mating plug connector part 31 is fitted on the printed circuit board 21, the power supply lines are routed electrically from the supply cable to the printed circuit board 21. This supplies the AC-side connection, i.e., the AC voltage side connection, of a rectifier of the converter, and the DC-side connection, e.g., the DC voltage side connection, of the rectifier is connected to a DC-side connection of an inverter whose AC-side connection, i.e., the AC voltage side connection, feeds the electric motor, e.g., the stator. The supply lines required for this are in turn routed via the mating plug connector part 31 and the plug connector part 11 to the stator winding lines which are connected to the further printed circuit board.

The further printed circuit board is also fitted with a connection 14 for extra-low voltages, e.g., signal voltages and/or 24 volt supply, and a connection for data transmission. The extra-low voltage lines and/or data lines routed from the outside for this purpose are routed through cable glands arranged in the bottom part 7 and routed to the connection 14 or, respectively, to the connection for data transmission. Shield clamps 2 connected to the metal sheet 1 can also be used to fix the associated cables.

The voltage present at the DC-side connection of the rectifier is monitored via a sensor for capturing the voltage, e.g., the intermediate circuit voltage. In order to avoid dangerously high voltages, e.g., when the electric motor is operating as a generator, a braking resistor 20 is provided, which is supplied with this voltage and connected in series with a controllable semiconductor switch. When the switch is closed, electrical power is dissipated to the braking resistor 20, which substantially converts it into heat.

The semiconductor switch is operated with pulse width modulation for precise control of the power dissipated. However, this means that the supply lines of the braking resistor 20 carry high-frequency current components.

The braking resistor 20 is arranged in the bottom part 7 to dissipate its heat. The braking resistor 20 is thermally conductively connected to the bottom part 7, e.g., pressed against a finely machined flat surface, e.g., with interposed thermally conductive paste.

For example, the braking resistor 20 is fastened to the bottom of the trough-shaped bottom part 7 and thermally conductively connected to the bottom part 7 in that the braking resistor 20 is pressed against a finely machined surface of the bottom part 7 via screws. The screws are screwed into threaded holes in the bottom part 7 and, with their screw heads, press the braking resistor 20 against the surface.

The metal sheet 1 is fastened to the bottom part 7 via screws so that the braking resistor 20 is at a distance from the metal sheet 1. In addition, the braking resistor 20 is arranged between the metal sheet 1 and the bottom part 7.

The supply lines of the braking resistor 20 are cables routed from the braking resistor 20 to a connection 10 fitted on the further printed circuit board. There they are connected to electrical lines that lead to the printed circuit board 21 via the plug connector part 11 and the mating plug connector part 31. One of the lines is connected to the upper potential of the DC-side connection of the rectifier, the other line is connected to the lower potential of the DC-side connection of the rectifier.

For example, the supply lines are arranged such that the metal sheet 1 is arranged between the supply lines and the printed circuit board 21. The metal sheet 1 thus shields the supply lines.

The metal sheet 1 is U-shaped. The metal sheet 1 thus has two legs 30 which are connected to each other via a yoke region 32.

The metal sheet 1 is fastened to the bottom part via the screws, e.g., at least respectively one of the screws protrudes through a respective leg 30.

Thus, the metal sheet 1 with its legs 30 and its yoke region 32 borders the opening of the stator housing 24, through which the stator winding wires are routed out of the region of the stator into the interior formed by the junction box.

As viewed from the printed circuit board 21, e.g., in its normal direction, the supply lines of the braking resistor 20 are routed below the yoke region 32 and the legs 30, e.g., on the side of the metal sheet 1 averted from the printed circuit board 21. The legs extend as far as possible to the connection 10, so that the part of the supply lines not shielded by the metal sheet 1 is as short as possible.

The metal sheet 1 has such a hole pattern that the shield clamps 2, 40 can be fastened in three different positions. In FIG. 1, all three positions are equipped by shield clamps 2, 40. The three positions merge into each other through a rotation of 90° or 180°. This means that cables can be routed through the cable glands on three different sides of the bottom part 7 and the shield clamps 2, 40 can be attached to the respective position so that the cable routed through the cable gland can be fixed as close as possible and directly by the shield clamp 2, 40.

This allows cables to be routed to the bottom part 7 from three different directions, e.g., directions that are rotated by 90° or 180° relative to each other, and the shield clamps 2, 40 can be provided in an accordingly optimized manner.

The further printed circuit board is inserted into a base part 12, which encloses the further printed circuit board in a housing-forming manner via a rear wall 9, which is clip-connected to the base part 12.

The base part 12 and the rear wall 9 are made of plastic. This provides for protection against contact. The connections 8, 10, 14, 13 protrude through the base part 12.

Two retaining sections 5, 15 spaced apart from each other are formed on the base part 12, which are fixed to the bottom part 7 via screws. In a first retaining section 15 of the two retaining sections 5, 15, a grounding plate is received, which is connected to the bottom part 7 in an electrically conductive manner. The grounding plate is arranged as an L-shaped sheet metal bracket and is soldered to the conducting path of the further printed circuit board.

On the inner side of the bottom part 7, e.g., on a respective side wall of the bottom part 7, an inwardly projecting dome region 3 is respectively formed, which extends parallel to the normal direction of the printed circuit board 21, e.g., also parallel to the actuating direction of the plug connector formed from the plug connector part 11 and the mating plug connector part 31.

A flat seal 16 is arranged between the bottom part 7 and the cover 22 placed on the bottom part 7, which flat seal 16 has a tab 18 which is hooked into a cutout, i.e., recess 17, of the dome region 3. In this manner, the flat seal 16 is fixed to the bottom part 7. Through the cutout, the remaining dome region 3 has a nose against which the tab 18 bears.

The tab 18 is bent 90° out of the plane of the connection of the cover 22 with the bottom part 7. This is because the bottom part 7 has a finely machined flat circumferential edge region on which the flat seal 16 with the exception of the tabs 18 is placed. The cover also has a finely machined flat circumferential edge region which is placed on the flat seal 16 with the exception of the tabs 18. Thus, the flat seal 16 with the exception of the tabs 18 defines the connecting plane of the cover 22 with the bottom part 7 if the wall thickness of the flat seal 16 is neglected.

The braking resistor is, for example, made of PTC semiconductor material and is thus self-protecting. The metal sheet 1 and the metal bottom part 7, which enclose the braking resistor on both or all sides, provides for efficient heat dissipation.

Alternatively, the braking resistor can be arranged as a wire winding. It is therefore possible for the metal sheet 1 to be made of a material for shielding the magnetic field. An aluminum metal sheet 1 is suitable for shielding the alternating component of the magnetic field. Alternatively or in addition, a ferromagnetic metal sheet is also possible to keep DC field components of the magnetic field away from the interior and the electronics, e.g., signal electronics, e.g., current sensors of the signal electronics. If the metal sheet 1 is made in two parts from aluminum sheet and ferromagnetic sheet, e.g., iron sheet or steel sheet, the metal sheet 1 can also be arranged as a composite part. For example, the aluminum sheet is bonded to the steel sheet.

For example, the dome regions 3 projecting inwards on the bottom part 7 are used to center the metal sheet 1.

LIST OF REFERENCE NUMERALS

1 Metal sheet
2 Shield clamp
3 Dome region
4 Recess
5 Retaining section
6 Screw
7 Lower part
8 Connection for low voltages
9 Rear wall
10 Connection for braking resistor
11 Plug connector part
12 Base part 13 Connection for data line, e.g., connection for USB connection 14 Connection for extra-low voltages 15 Retaining section 16 Seal, e.g., flat seal 17 Recess in the dome section 18 Tab or similar 20 Braking resistor 21 Printed circuit board 22 Cover 23 Power semiconductor 24 Stator housing 25 Bearing flange 26 Bearing 27 Rotor shaft 28 Bearing flange 29 Bearing 30 Leg 31 Mating plug connector part 32 Yoke region 40 Shield clamp

The invention claimed is:

1. A converter motor, comprising:

an electric motor including a junction box, the junction box including a bottom part and a cover arranged on the bottom part;

a printed circuit board fastened to the cover;

a sheet connected to the bottom part; and a braking resistor thermally conductively connected to the bottom part and/or fastened to the bottom part and arranged on a side of the sheet that faces away from the printed circuit board;

wherein the sheet has two legs connected via a yoke region of the sheet, supply lines of the braking resistor being arranged on a side of one of the legs facing away from the printed circuit board.

2. The converter motor according to claim 1, wherein the printed circuit board includes signal electronics and power electronics and is fastened on an inner side of the cover, the braking resistor being thermally conductively connected to the bottom part and/or being fastened to the bottom part to dissipate heat of the braking resistor to the bottom part, the sheet being arranged as a metal sheet.

3. The converter motor according to claim 1, further comprising a rectifier and an inverter, the rectifier having a DC-side connection connected to a DC-side connection of an inverter.

4. The converter motor according to claim 3, wherein a series circuit formed from a braking resistor and a pulse-width modulated controlled switch is adapted to be fed by a voltage applied to the DC-side connection of the rectifier and/or the inverter.

5. The converter motor according to claim 4, wherein the braking resistor includes a semiconductor material, is arranged as a semiconductor, and/or is arranged as a PTC braking resistor.

6. The converter motor according to claim 1, wherein a converter of the converter motor is adapted to feed the electric motor.

7. The converter motor according to claim 6, wherein the converter is arranged in the junction box of the electric motor.

8. The converter motor according to claim 1, wherein a further printed circuit board is arranged between a base part and a rear wall connected to the base part, the base part being arranged in and connected to the bottom part.

9. The converter motor according to claim 8, wherein the further printed circuit board includes a connection for supply lines of the braking resistor, the further circuit board including a plug connector part and the printed circuit board including a mating plug connector part, the mating plug connector part corresponding to the plug connector part.

10. The converter motor according to claim 9, wherein the supply lines are routed from the braking resistor to the connection.

11. The converter motor according to claim 8, wherein the base part includes retaining sections pressed onto the bottom part via screws.

12. The converter motor according to claim 11, wherein a grounding plate is received in one of the retaining sections.

13. The converter motor according to claim 8, wherein the further printed circuit board includes a low voltage connection, an extra low voltage connection, and a data transmission connection, a low-voltage cable, an extra-low voltage cable, and/or a data transmission cable passing through at least one cable gland of the bottom part and being fixed to the sheet via at least one shield clamp.

14. The converter motor according to claim 13, wherein an exposed shield of one of the cables is electrically connected to the sheet via the shield clamp.

15. The converter motor according to claim 13, wherein the sheet is electrically connected to the bottom part and/or a grounding plate.

16. The converter motor according to claim 1, wherein the braking resistor is arranged on a side of the yoke region that faces away from the printed circuit board.

17. The converter motor according to claim 1, wherein the sheet is arranged as a punched and bent part.

18. The converter motor according to claim 1, wherein the electric motor includes a stator housing, a stator of the electric motor being received in the stator housing, a vertical projection of the two legs and the yoke region in a normal direction of the printed circuit board borders a vertical projection of an opening in the stator housing in the normal direction.

19. The converter motor according to claim 1, wherein the sheet includes a hole pattern and/or continuous holes adapted to fasten to shield clamps at different positions on the sheet.

20. The converter motor according to claim 19, wherein the shield clamps are rotatable by 90° or 180° relative to each other.

21. The converter motor according to claim 1, wherein cable glands are arranged on three different sides of the bottom part, the cable glands adapted to feed cables through the cable glands in different directions.

22. The converter motor according to claim 21, wherein the cable glands are adapted to feed cables through the cable glands from directions rotated 90° or 180° relative to each other.

* * * * *